(12) United States Patent
Conway

(10) Patent No.: US 10,430,343 B2
(45) Date of Patent: Oct. 1, 2019

(54) ACCELERATION OF CACHE-TO-CACHE DATA TRANSFERS FOR PRODUCER-CONSUMER COMMUNICATION

(71) Applicant: Advanced Micro Devices, Inc., Sunnyvale, CA (US)

(72) Inventor: Patrick N. Conway, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 61 days.

(21) Appl. No.: 15/437,843

(22) Filed: Feb. 21, 2017

(65) Prior Publication Data

US 2018/0239708 A1 Aug. 23, 2018

(51) Int. Cl.
| | |
|---|---|
| *G06F 12/128* | (2016.01) |
| *G06F 12/0811* | (2016.01) |
| *G06F 12/0815* | (2016.01) |
| *G06F 12/0888* | (2016.01) |

(52) U.S. Cl.
CPC ...... *G06F 12/0888* (2013.01); *G06F 12/0811* (2013.01); *G06F 12/128* (2013.01); *G06F 12/0815* (2013.01); *G06F 2212/1024* (2013.01); *G06F 2212/6046* (2013.01)

(58) Field of Classification Search
CPC ............... G06F 1/00–3296; G06F 3/00; G06F 3/06–0689; G06F 5/00–16; G06F 7/00–785; G06F 9/00–548; G06F 11/00–3696; G06F 12/00–16; G06F 13/00–4295; G06F 15/00–825; G06F 17/00–5095; G06F 19/00–709; G06F 21/00–88; G06F 2003/0691–0698; G06F 2009/45562–45595; G06F 2201/00–885; G06F 2205/00–126; G06F 2206/00–20; G06F 2207/00–7295;

(Continued)

(56) References Cited

U.S. PATENT DOCUMENTS 6,038,643 A * 3/2000 Tremblay ............ G06F 9/30021
711/132
6,321,297 B1 * 11/2001 Shamanna .......... G06F 12/0864
710/52

(Continued)

OTHER PUBLICATIONS

Cache coherence protocols: evaluation using a multiprocessor simulation model; Archibald et al.; ACM Transactions on Computer Systems, vol. 4, iss. 4, pp. 273-298; Nov. 1986 (Year: 1986).*

(Continued)

*Primary Examiner* — Daniel C. Chappell
(74) *Attorney, Agent, or Firm* — Zagorin Cave LLP

(57) ABSTRACT

A communication bypass mechanism accelerates cache-to-cache data transfers for communication traffic between caching agents that have separate last-level caches. A method includes bypassing a last-level cache of a first caching agent in response to a cache line having a modified state being evicted from a penultimate-level cache of the first caching agent and a communication attribute of a shadow tag entry associated with the cache line being set. The communication attribute indicates prior communication of the cache line with a second caching agent having a second last-level cache.

20 Claims, 4 Drawing Sheets

(58) Field of Classification Search
CPC ........ G06F 2209/00–549; G06F 2211/00–902; G06F 2212/00–7211; G06F 2213/00–0064
See application file for complete search history.

(56) References Cited

U.S. PATENT DOCUMENTS

| | | | | |
|---|---|---|---|---|
| 6,938,128 | B1* | 8/2005 | Kuskin | G06F 12/0817 711/119 |
| 6,976,131 | B2* | 12/2005 | Pentkovski | G06F 12/0811 711/130 |
| 7,287,126 | B2* | 10/2007 | Desai | G06F 12/0817 711/145 |
| 7,373,466 | B1* | 5/2008 | Conway | G06F 12/082 711/156 |
| 7,596,661 | B2* | 9/2009 | Hsu | G06F 12/0848 711/122 |
| 7,600,080 | B1* | 10/2009 | Bhattacharyya | G06F 12/0817 711/118 |
| 8,176,259 | B2* | 5/2012 | Van Doren | G06F 12/0831 710/120 |
| 9,411,728 | B2* | 8/2016 | Shalev | G06F 12/08 |
| 2002/0046324 | A1* | 4/2002 | Barroso | G06F 12/0826 711/122 |
| 2003/0217235 | A1* | 11/2003 | Rowlands | G06F 12/0831 711/141 |
| 2004/0059877 | A1 | 3/2004 | Brown et al. | |
| 2004/0068620 | A1* | 4/2004 | Van Doren | G06F 12/0804 711/144 |
| 2004/0268054 | A1 | 12/2004 | Peir et al. | |
| 2005/0172079 | A1* | 8/2005 | McFarling | G06F 12/0802 711/133 |
| 2008/0133834 | A1* | 6/2008 | Gaither | G06F 12/0813 711/118 |
| 2008/0215820 | A1* | 9/2008 | Conway | G06F 12/082 711/141 |
| 2010/0161904 | A1* | 6/2010 | Cypher | G06F 12/0811 711/122 |
| 2010/0169582 | A1* | 7/2010 | Hinton | G06F 12/0817 711/146 |
| 2010/0235579 | A1* | 9/2010 | Biles | G06F 12/0862 711/125 |
| 2014/0189254 | A1* | 7/2014 | Pardo | G06F 12/0822 711/146 |
| 2015/0143046 | A1* | 5/2015 | Hagersten | G06F 12/1054 711/122 |
| 2015/0269090 | A1 | 9/2015 | Tran et al. | |
| 2016/0085677 | A1* | 3/2016 | Loh | G06F 12/0815 711/143 |
| 2016/0092360 | A1* | 3/2016 | Moll | G06F 12/0811 711/144 |
| 2016/0203079 | A1 | 7/2016 | Cox et al. | |
| 2017/0177484 | A1* | 6/2017 | Conway | G06F 12/0895 |

OTHER PUBLICATIONS

Low-latency explicit communication and synchronization in scalable multi-core clusters; Kachris et al.; International Conference on Cluster Computing Workshops and Posters; Sep. 20-24, 2010 (Year: 2010).*

Tiny Directory: Efficient Shared Memory in Many-Core Systems with Ultra-Low-Overhead Coherence Tracking; Shukla et al.; IEEE International Symposium on High Performance Computer Architecture; Feb. 4-8, 2017 (Year: 2017).*

Aisopos, K., et al., "Extending Open Core Protocol to Support System-Level Cache Coherence," CODES+ISSS, Oct. 19-24, 2008, 6 pages.

Conway, P., "Cache Hierarchy and Memory Subsystem of the AMD Opteron Processor," IEEE Computer Society, 2010, pp. 16-29.

Jackson, Mike, "Overview of Changes to PCI Express 3.0," Mindshare, Inc., downloaded Nov. 1, 2016 from www.mindshare.com/files/resources/PCIe%203-0.pdf, 4 pages.

Wagh, Mahesh, PCI Express* 3.0 Technology:Device Architecture Optimizations on Intel Platforms, TCIS006, IDF2009 Intel Developer Forum, Sep. 22, 2009, 33 pages.

* cited by examiner

300

| TAG | STATE | CLV | LSV | RSV | OWNER | PREV_OWNER | CSTATE |

ACCELERATION OF CACHE-TO-CACHE DATA TRANSFERS FOR PRODUCER-CONSUMER COMMUNICATION

BACKGROUND

Description of the Related Art

In a typical computing system, a memory system is designed with a goal of low latency experienced by a processor when accessing arbitrary units of data. In general, the memory system design takes advantage of memory access properties known as temporal locality and spatial locality. Temporal locality refers to multiple accesses to specific memory locations within a relatively small time period. Spatial locality refers to accesses to memory locations relatively close in the address space within a relatively small time period.

Typically, temporal locality is evaluated in terms of a granularity smaller than that of a next level in a memory hierarchy. For example, a cache captures a repeated access of blocks of fixed size (i.e., cache lines, e.g., blocks of 64 Bytes (B)), which are smaller than the storage granularity of main memory (e.g., 4 Kilobyte (KB) pages). A cache captures spatial locality by storing locally quantities of sequentially stored data slightly larger than a requested quantity in order to reduce memory access latency in the event of sequential access. For example, a cache is designed to store 64 B blocks, although a processor requests one to eight Bytes at a time. Meanwhile, the cache requests blocks of 64 B at a time from a memory, which stores pages of 4 KB contiguous portions.

In a shared memory multiprocessor system, workloads may cause communications between caching agents (e.g., processors, graphics processing units, processor offload engines, or other processing units that each include a cache in a node, socket, or other multi-processor system). Communications between caching agents that do not share a last-level cache may result in cache-to-cache latency for communication traffic between caching agents. In general, as cache sizes grow larger over time (e.g., using die stacked SRAM), the proportion of communication misses will increase and increase the effects of cache-to-cache latency for communication traffic between caching agents. Thus, improved techniques for communication between caching agents is desired.

SUMMARY OF EMBODIMENTS OF THE INVENTION

In at least one embodiment of the invention, a method includes storing a communication attribute in a shadow tag entry associated with a cache line stored in a penultimate-level cache of a first caching agent having a first last-level cache. The method includes bypassing the first last-level cache in response to the cache line having a modified state, the cache line being evicted from the penultimate-level cache, and the communication attribute having a first state. The first state of the communication attribute indicates prior communication of the cache line with a second caching agent having a second last-level cache. The method may include storing the cache line in the first last-level cache in response to the cache line having the modified state, the cache line being evicted from the penultimate-level cache, and the communication attribute having a second state.

The bypassing may include issuing a victim packet including a communication bypass attribute and the cache line to a directory controller and writing the cache line to a buffer by the directory controller. The bypassing may further include issuing a storing probe packet by the directory controller to the second caching agent in response to receiving the victim packet. The second caching agent may be identified as a previous owner of the cache line by communication history information for the cache line. The bypassing may further include prefetching the cache line into a second last-level cache of the second caching agent, setting to the first state an associated communication attribute in a second shadow tag entry of the second caching agent, and updating the communication history information for the cache line in response to receiving the storing probe packet by the second caching agent. The method may include setting to the first state the communication attribute in response to satisfying a memory request miss of the first last-level cache by a read response from the second caching agent. The method may include storing communication history information for the cache line in a probe filter.

In at least one embodiment of the invention, an apparatus includes a probe filter configured to store communication history information for a cache line stored in a first caching agent having a first last-level cache. The apparatus includes a controller configured to store the cache line in response to the cache line being evicted from a penultimate-level cache of the first caching agent and configured to provide the cache line to a second caching agent having a second last-level cache in response to the communication history information. The communication history information may be set in response to the cache line being provided by the first caching agent to a second caching agent in response to a directed probe. The communication history information may include a previous owner identifier and a communication state.

The first caching agent may include a shadow tag memory associated with the first last-level cache. The shadow tag memory may be configured to store a communication attribute for the cache line. The communication attribute may have a first state in response to a read response from the second caching agent initiated by a miss in the first last-level cache. The first caching agent may be configured to issue a victim packet including a communication bypass attribute to the controller in response to the cache line having a modified state being evicted from a penultimate-level cache of the first caching agent and in response to the communication attribute having the first state. The controller may be configured to issue a storing probe packet to the second caching agent in response to receiving a victim packet from the first caching agent. The probe filter may identify the second caching agent as a previous owner of the cache line in the communication history information. The second caching agent may be configured to prefetch the cache line into the second last-level cache and to set to the first state an associated communication attribute in a second shadow tag of the second caching agent.

In at least one embodiment of the invention, an apparatus includes a shadow tag memory configured to store a communication attribute associated with a cache line stored in a penultimate-level cache of a first caching agent having a first last-level cache. The apparatus includes control logic configured to bypass the first last-level cache in response to the cache line having a modified state, the cache line being evicted from the penultimate-level cache, and the communication attribute having a first state. The first state indicates prior communication of the cache line with a second caching agent having a second last-level cache. The control logic may be further configured to store the cache line in the first last-level cache in response to the cache line having the modified state, the cache line being evicted from the penultimate-level cache, and the communication attribute having a second state. The apparatus may include a probe filter configured to store status information and communication history information for the cache line. The apparatus may include a directory controller configured to store the cache line to main memory in response to the cache line being evicted from the penultimate-level cache and configured to provide the cache line to the second caching agent responsive to the communication history information.

BRIEF DESCRIPTION OF THE DRAWINGS

The present invention may be better understood, and its numerous objects, features, and advantages made apparent to those skilled in the art by referencing the accompanying drawings.

FIG. 4 illustrates exemplary data fields of an entry in the line probe filter of the exemplary processing system of FIG. 1 consistent with at least one embodiment of the invention.

The use of the same reference symbols in different drawings indicates similar or identical items.

DETAILED DESCRIPTION

Figure 1:
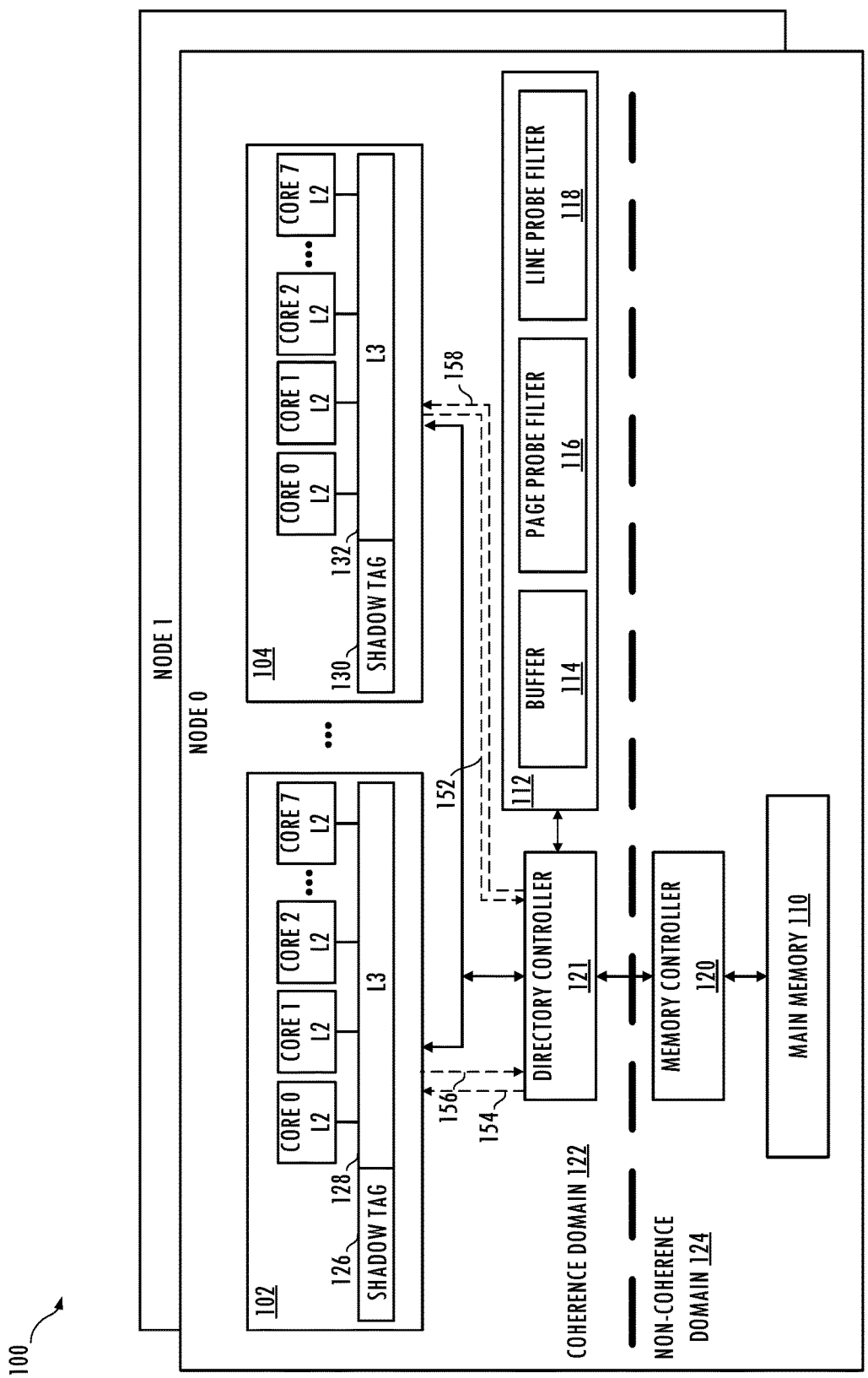
FIG. 1 illustrates a functional block diagram of an exemplary processing system and exemplary consumer-producer communications between caching agents consistent with at least one embodiment of the invention.

A technique for accelerating cache-to-cache transfers between caching agents attempts to prefetch a cache line by a consumer caching agent. Since the consumer caching agent generally does not know when a cache line has been made available by a producer caching agent, the prefetching technique alone is as likely to degrade performance as it is to improve performance depending on the timing of the prefetch by the consumer caching agent.

Another technique for accelerating cache-to-cache transfers introduces a new attribute associated with each cache line stored in a caching agent. The attribute indicates the provenance of an associated cache line. When a cache fill request is serviced by another caching agent and the cache line is dirty, then the cache line is categorized as a communication cache line. When that cache line is eventually cast out of a private cache of the caching agent, the cache line is installed in the last-level cache only if the cache line is not a communication cache line. Otherwise, the cache line is written back to main memory. When the consumer caching agent requests that cache line, it is returned from main memory instead of the cache in the producer caching agent. This approach provides a modest benefit if the latency of accessing the data from main memory is less than a cache-to-cache transfer. However, under some circumstances this technique wastes power unnecessarily by writing a cache line that is involved in producer-consumer communication to main memory and unnecessarily reading that cache line back from main memory.

A communication bypass mechanism accelerates cache-to-cache data transfers for cache lines communicated between caching agents that have private last-level caches. The acceleration provided by the communication bypass mechanism increases with increases to the size of the last-level cache. In some applications, since a next access to a cache line is likely to be a read from a consumer caching agent, the communication bypass mechanism uses an eviction of the cache line from the penultimate-level cache (e.g., a level-two cache of a three level cache) of a producer caching agent to trigger a transfer of the cache line to the last-level cache (e.g., a level-three cache of the three level cache) of the consumer caching agent prior to a request for the cache line by the consumer caching agent.

The communication bypass mechanism uses a shadow tag, which is a cache-like hardware structure that is associated with a last-level cache. The shadow tag records any cache lines stored in a penultimate-level cache or higher-level cache of the cores. The shadow tag maintains communication information indicating whether the associated cache line is involved in communication between caching agents. The last-level cache sets the communication information when it receives or provides the associated cache line in response to a directed probe. The caching agent subsequently bypasses a last-level cache install for a communication line when that cache line is evicted from a penultimate-level cache. That victim cache line is associated with state information and a destination that a directory controller uses to inject the data into the last-level cache of a consumer caching agent before the consumer caching agent requests the data. The mechanism allows the consumer caching agent to directly access the data of the victim cache line from its cache and avoid the latency of a cache-to-cache transfer from the last-level cache of the producer caching agent. The directory controller uses the communication history information stored in a probe filter to steer cache lines evicted from a cache of a producer caching agent to a cache of a consumer caching agent.

Referring to FIG. 1, processing system 100 (e.g., a server) includes multiple processing nodes (e.g., node 0 and node 1). Each processing node includes multiple caching agents (e.g., processors 102 and 104 coupled to main memory 110). For example, caching agent 102, is a processor including core 0, core 1, core 2, . . . core 7 and caching agent 104, is a processor including core 0, core 1, core 2, . . . core 7) and a memory system. Each of the nodes accesses its own memory within corresponding coherence domain 122 faster than memory in non-coherence domain 124 (e.g., main memory 110) or memory in another node. As referred to herein, a coherence domain refers to a subset of memory (e.g., cache memory of node 0) for which a cache coherence mechanism maintains a coherent view of copies of shared data. A non-coherence domain refers to memory not included in the coherence domain (e.g., main memory 110 or cache memory in another node). Each of the caching agents in a node includes a last-level cache shared by the cores of the caching agent. Each core includes a private penultimate-level cache. For example, caching agent 102 includes last-level cache 128, which is a level-three cache shared by core 0, core 1, core 2, . . . core 7, and includes a level-two cache within each of core 0, core 1, core 2, . . . core 7. Last-level cache 128 and each level-two cache of caching agent 102 includes storage elements, e.g., storage implemented in fast static Random Access Memory (RAM) or other suitable storage elements. Cache control logic is distributed across last-level cache 128 and each level-two cache of caching agent 102. The caching agents use inter-processor communication via directory controller 121 to maintain coherency of a memory image in main memory 110 when caches of more than one caching agent contain the same cache line (i.e., a copy of contents of the same location of main memory 110) of coherence domain 122. In at least one embodiment of processing system 100, probe filter 112 includes storage for a cache directory used to implement a directory-based cache coherency policy. Probe filter 112 is implemented in fast static RAM associated with directory controller 121 or by other suitable storage technique.

Probe filter 112 includes line probe filter 118 and buffer 114. Buffer 114 is used and reused as temporary storage for communications between caching agent 102, caching agent 104, and main memory 110. In at least one embodiment, probe filter 112 includes page probe filter 116, which tracks pages stored in the caches (e.g., 4 KB pages) of coherence domain 122 and line probe filter 118 tracks the caching status for any cache lines shared across caching agents (e.g., written to by a core) in coherence domain 122 and any associated communication history.

FIG. 4 illustrates an exemplary line probe filter entry. A portion of the line probe filter entry 300 includes conventional caching status information (e.g., tag, state, owner, etc.) and additional communication history information. The state information is consistent with a conventional cache coherency protocol (e.g., MOESI protocol) for instruction fetches, data loads, and data store operations. Line probe filter entry 300 optionally includes presence information indicating which caching agents have accessed a line entry in line probe filter such as cluster valid information (CLV), local socket valid information (LSV), remote socket valid information (RSV). In addition, line probe filter entry 300 includes communication history bits for storing previous state information including an indication of a previous owner of the cache line associated with the tag and a communication state for the cache line associated with the tag. The communication state indicates one of the line being invalid, owned by a producer, owned by a consumer, and indication of communication between caching agents. The communication history information not required or used to maintain cache coherence by the conventional cache coherency protocol.

Referring to FIGS. 1 and 4, a memory request of caching agent 104 that results in a cache miss (i.e., the cache line does not reside in any level of the cache in caching agent 104) causes caching agent 104 to issue probe 152 to directory controller 121 requesting the cache line from main memory. Directory controller 121 accesses line probe filter 118 and determines whether the target cache line resides in a cache of another caching agent. In response to an indication that the target cache line resides in a cache of caching agent 102, directory controller 121 issues direct probe 154 to caching agent 102 and receives the cache line from caching agent 102 in response 156. Directory controller 121 updates the communication history information in line probe filter entry 300 for the cache line in line probe filter 118 and sends the associated data to caching agent 104 in response 158. For example, directory controller 121 updates a communication state stored in field CSTATE and an identifier of the previous owner stored in field PREV_OWNER of line probe filter entry 300. In addition, caching agent 104 sets a communication attribute in shadow tag 130 indicating that this cache line was already resident in a cache of another caching agent within coherence domain 122 and was communicated to caching agent 104 by that other caching agent instead of being fetched from memory outside coherence domain 122 (e.g., by memory controller 120 from main memory 110).

Figure 2:
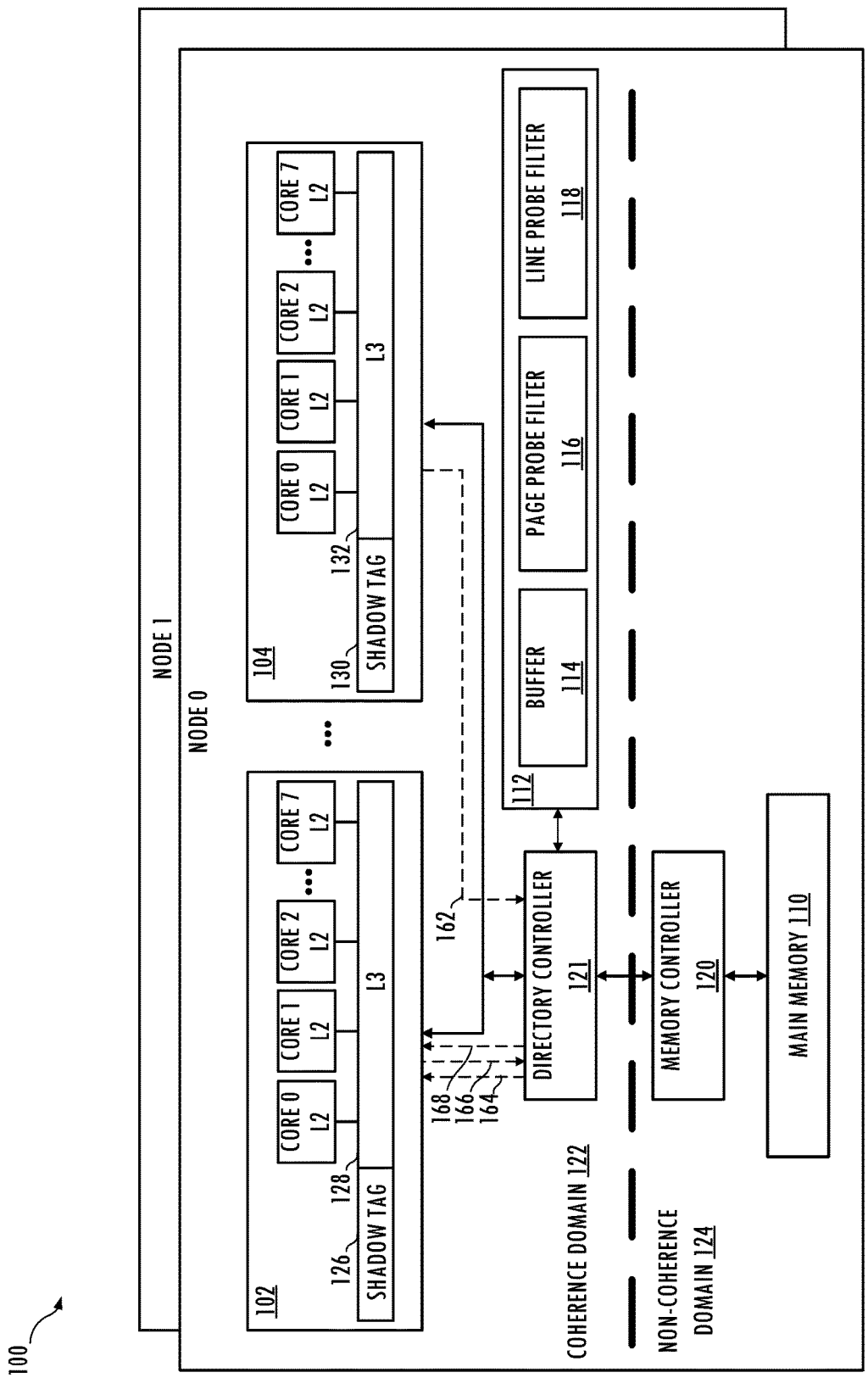
FIG. 2 illustrates a functional block diagram of the exemplary processing system of FIG. 1 and exemplary consumer-producer communications between caching agents consistent with at least one embodiment of the invention.

Referring to FIGS. 2 and 4, when caching agent 104 evicts a cache line from the penultimate-level cache (e.g., level-two cache of core 0 in caching agent 104), if the victim cache line has a modified or dirty state, caching agent 104 determines a status of an associated communication attribute in shadow tag 130. If the associated communication attribute in shadow tag 130 is set to a state indicating prior communication of the cache line with another caching agent having a last-level cache, then cache control logic in caching agent 104 bypasses the last-level cache (e.g., level-three cache 132) and writes the victim cache line back to main memory 110 rather than installing the cache line in last-level cache 132. For example, caching agent 104 sends victim packet 162 to directory controller 121, which stores the victim cache line in buffer 114 temporarily as part of a process of writing the modified data back to main memory 110 using memory controller 120.

In at least one embodiment, victim packet 162 carries a communication bypass attribute that causes directory controller 121 to send storing probe 164 to the previous owner indicated in the communication history field of associated line probe filter entry 300 in line probe filter 118. Storing probe 164 serves as a hint to caching agent 102 that the cache line is being written back to main memory 110 and then cache-to-cache data transfers may be accelerated. If the previous owner is caching agent 102, in response to storing probe 164, caching agent 102 sends prefetch 166. In response to prefetch 166, directory controller 121 sends response 168, which causes cache control logic to install the cache line into the last-level cache of caching agent 102 (e.g., level-three cache 128) and sets an associated communication attribute for the cache line in shadow tag 126. Since at least some of the cache line resides in buffer 114, the installation of the cache line in caching agent 102 is further accelerated by the prefetch, as compared to a later fetch of the cache line from main memory 110. If the communication attribute associated with the victim cache line has a value indicating that the cache line was not communicated to caching agent 104 by another caching agent, then caching agent 104 installs the data associated with that cache line in the last-level cache, as is typical of eviction from the penultimate-level cache. Note that the probe messages and responses of FIGS. 1 and 2 are exemplary only and other probe messages and responses between caching agent 102 or caching agent 104, and directory controller 121 may be used.

Figure 3:
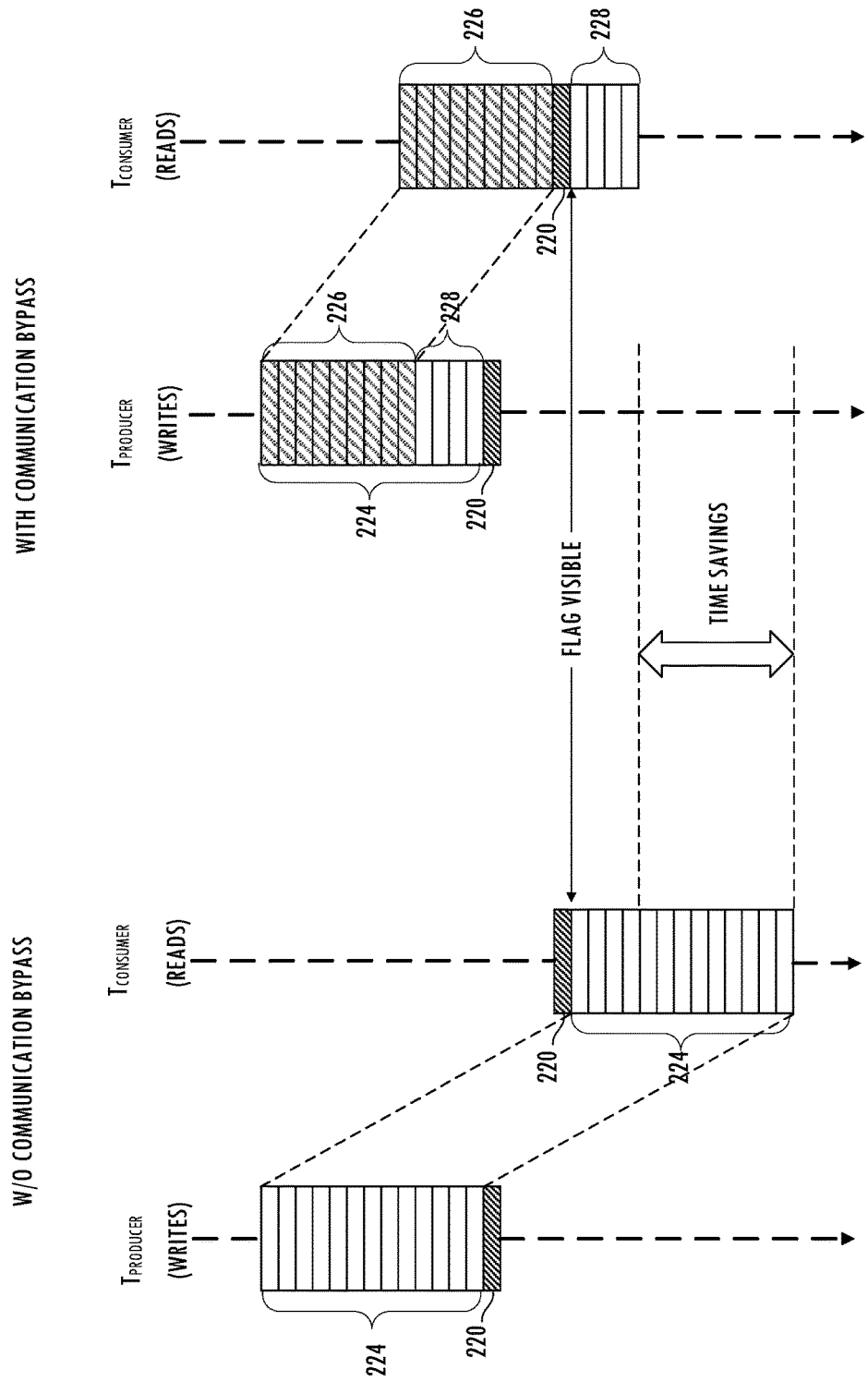
FIG. 3A illustrates conventional cache-to-cache transfers between a producer caching agent and a consumer caching agent.
FIG. 3B illustrates exemplary cache-to-cache transfers between a producer caching agent and a consumer caching agent using the communication bypass mechanism of the exemplary processing system of FIG. 1 consistent with at least one embodiment of the invention.

Referring to FIGS. 2 and 3A, since the communication bypass mechanism targets a data communication buffer, and not a synchronization flag, the communication bypass mechanism takes advantage of communication patterns and reuse of buffer 114, which is shared by caching agents 102 and 104. The communication bypass mechanism accelerates cache-to-cache data transfers by preloading a cache line into a destination last-level cache of a consumer caching agent and/or writing a victim cache line to main memory before the consumer agent uses the victim data. In a conventional system of FIG. 3A, the communication bypass mechanism is not implemented. In response to a producer caching agent evicting cache line 224 (e.g., N lines cache lines), the memory controller writes those victim cache lines to main memory. Upon completion of the write to main memory, the producer caching agent writes flag 220 indicating that the data communication buffer contains valid data. Meanwhile, in response to a consumer caching agent requesting the cache line, the consumer caching agent polls buffer 114 until flag 220 is visible. In response to detecting flag 220, the consumer caching agent reads the cache line from main memory.

A system implementing the communication bypass mechanism of FIGS. 1, 2, and 4, installs at least portion 226 of cache line 224 into the last-level cache of the consumer caching agent before the producer caching agent finishes writing the cache line to main memory and writing flag 220, as illustrated in FIG. 3B. For example, in response to a prefetch initiated by eviction of a cache line from a penultimate-level cache, portion 226 of cache line 224 is deposited in the last-level cache of the consumer caching agent, from buffer 114, and prior to directory controller 121 writing flag 220. When the consumer caching agent prefetches that victim cache line, the consumer caching agent reads portion 226 from buffer 114 to level-three cache 128 and polls flag 220. In response to flag 220 being set, the consumer caching agent obtains remaining portion 228 from main memory using conventional memory transactions. A subsequent access to the prefetched cache line is serviced from the cache of the consumer caching agent instead of from another caching agent or main memory. Thus, the communication bypass mechanism reduces latency of cache-to-cache communications between caching agents.

Thus, a communication bypass mechanism that reduces the latency of cache-to-cache transfers for producer-consumer communication between caching agents in a shared memory multiprocessor system has been described. The reduced latency increases throughput and reduces response times for workloads that have a high level of producer-consumer communication (e.g., inter-task communications). Bus trace analysis for benchmark simulations indicates that several exemplary workloads involve only a small number of cache lines in communication and heavily access those cache lines. Thus, buffer 114 need not be large to capture the set of cache lines involved in producer-consumer communication. Performance for cache-to-cache transfers of a probe filter-based (i.e., cache directory-based) system approaches the performance for cache-to-cache transfers in systems including a large center last-level cache that is shared by all cores in a node.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which a MOESI cache coherence protocol is used and three levels of cache are used, one of skill in the art will appreciate that the teachings herein can be utilized with other cache coherence protocols and caches having other numbers of levels. In addition, while the invention has been described in embodiments in which the caching agents are multi-core processors, one of skill in the art will appreciate that the teachings herein can be utilized to accelerate producer-consumer communication between any pair of caching agents (e.g., processor core-to-processor core, processor core-to-GPU, processor core-to-offload engine, etc.). Variations and modifications of the embodiments disclosed herein, may be made based on the description set forth herein, without departing from the scope of the invention as set forth in the following claims.

What is claimed is:

1. A method comprising:
   storing a communication attribute in a shadow tag entry associated with a cache line stored in a penultimate-level cache of a first caching agent having a first last-level cache; and
   bypassing the first last-level cache in response to the cache line having a modified state, the cache line being evicted from the penultimate-level cache, and the communication attribute having a first state,
   wherein the first state indicates prior cache-to-cache communication of the cache line to the first caching agent and from a second caching agent having a second last-level cache, the prior cache-to-cache communication being within a coherence domain including the first caching agent, the second caching agent, and a directory controller.

2. The method, as recited in claim 1, further comprising:
   storing the cache line in the first last-level cache in response to the cache line having the modified state, the cache line being evicted from the penultimate-level cache, and the communication attribute having a second state.

3. The method, as recited in claim 1, wherein the bypassing comprises:
   issuing a victim packet including a communication bypass attribute and the cache line to the directory controller; and
   writing the cache line to a buffer by the directory controller.

4. The method, as recited in claim 3, wherein the bypassing further comprises:
   issuing a storing probe packet by the directory controller to the second caching agent in response to receiving the victim packet, the second caching agent being identified as a previous owner of the cache line by communication history information for the cache line.

5. The method, as recited in claim 4, wherein the bypassing further comprises:
   prefetching the cache line into the second last-level cache, setting to the first state an associated communication attribute in a second shadow tag entry of the second caching agent, and updating the communication history information for the cache line in response to receiving the storing probe packet by the second caching agent.

6. The method, as recited in claim 1, further comprising:
   setting to the first state the communication attribute in response to satisfying a memory request miss of the first last-level cache by a read response from the second caching agent.

7. The method, as recited in claim 1, further comprising:
   storing communication history information for the cache line in a probe filter, wherein the communication history information includes a previous owner identifier and a communication state.

8. The method, as recited in claim 7, wherein the communication state indicates the cache line being invalid, the cache line being owned by a producer, the cache line being owned by a consumer, or the cache line being communicated between the first caching agent and the second caching agent in response to a directed probe.

9. The method, as recited in claim 1, wherein the prior cache-to-cache communication comprises:
issuing a first request for the cache line to the directory controller by the first caching agent;
issuing a second request for the cache line by the directory controller to the second caching agent;
communicating the cache line by the second caching agent to the directory controller; and
communicating the cache line by the directory controller to the first caching agent.

10. An apparatus comprising:
a probe filter configured to store communication history information for a cache line stored in a first caching agent having a first last-level cache; and
a controller configured to store the cache line in response to the cache line being evicted from a penultimate-level cache of the first caching agent and configured to provide the cache line to a second caching agent having a second last-level cache in response to the communication history information,
wherein the communication history information is based on whether the cache line has been communicated by a cache-to-cache communication between the first caching agent and the second caching agent within a coherence domain including the first caching agent, the second caching agent, and the controller.

11. The apparatus, as recited in claim 10, wherein the communication history information is set in response to the cache line being provided by the second caching agent to the first caching agent in response to a directed probe.

12. The apparatus, as recited in claim 10, wherein the communication history information includes a previous owner identifier and a communication state.

13. The apparatus, as recited in claim 12, wherein the communication state indicates the cache line being invalid, the cache line being previously owned by a producer, the cache line being previously owned by a consumer, or the cache line being communicated between the first caching agent and the second caching agent in response to a directed probe.

14. The apparatus, as recited in claim 10, further comprising:
the first caching agent comprising:
a shadow tag memory associated with the first last-level cache, the shadow tag memory being configured to store a communication attribute for the cache line, the communication attribute having a first state in response to a read response from the second caching agent initiated by a miss in the first last-level cache,
wherein the first state indicates prior cache-to-cache communication of the cache line to the first caching agent and from the second caching agent.

15. The apparatus, as recited in claim 14,
wherein the first caching agent is configured to issue a victim packet including a communication bypass attribute to the controller in response to the cache line having a modified state and in response to the communication attribute having the first state.

16. The apparatus, as recited in claim 14, wherein the controller is configured to issue a storing probe packet to the second caching agent in response to receiving a victim packet from the first caching agent, the probe filter identifying the second caching agent as a previous owner of the cache line in the communication history information.

17. The apparatus, as recited in claim 14, wherein the second caching agent is configured to prefetch the cache line into the second last-level cache and to set to the first state an associated communication attribute in a second shadow tag of the second caching agent.

18. An apparatus comprising:
a shadow tag memory configured to store a communication attribute associated with a cache line stored in a penultimate-level cache of a first caching agent having a first last-level cache; and
control logic configured to bypass the first last-level cache in response to
the cache line having a modified state,
the cache line being evicted from the penultimate-level cache, and
the communication attribute having a first state,
wherein the first state indicates prior cache-to-cache communication of the cache line to the first caching agent and from a second caching agent having a second last-level cache, wherein the prior cache-to-cache communication is within a coherence domain including the first caching agent, the second caching agent, and a directory controller.

19. The apparatus, as recited in claim 18, wherein the control logic is further configured to store the cache line in the first last-level cache in response to the cache line having the modified state, the cache line being evicted from the penultimate-level cache, and the communication attribute having a second state.

20. The apparatus, as recited in claim 18, further comprising:
a probe filter configured to store status information and communication history information for the cache line,
wherein the directory controller is configured to store the cache line to main memory in response to the cache line being evicted from the penultimate-level cache and configured to provide the cache line to the second caching agent responsive to the communication history information.

* * * * *